United States Patent [19]
Mason et al.

[11] Patent Number: 5,359,013
[45] Date of Patent: Oct. 25, 1994

[54] POLYMER NYLON COMPOSITIONS FEATURING IMPROVED RATES OF CRYSTALLIZATION AND METHOD FOR FORMING THE SAME

[75] Inventors: Charles D. Mason, Chatham Township, Morris County; Nicholas Vanderkooi, Jr., Pompton Plains, both of N.J.

[73] Assignee: AlliedSignal Inc., Morristownship, Morris County, N.J.

[21] Appl. No.: 217,004

[22] Filed: Mar. 24, 1994

Related U.S. Application Data

[63] Continuation of Ser. No. 76,492, Jun. 14, 1993, abandoned, which is a continuation of Ser. No. 609,689, Nov. 6, 1990, abandoned.

[51] Int. Cl.[5] .......................................... C08L 77/00
[52] U.S. Cl. ............................... 525/432; 264/176.1
[58] Field of Search ......................................... 525/432

[56] References Cited

U.S. PATENT DOCUMENTS

| | | | |
|---|---|---|---|
| 2,698,966 | 1/1955 | Stott et al. | 525/432 |
| 3,367,926 | 2/1968 | Vocks et al. | 260/93.5 |
| 3,549,651 | 12/1970 | Oswald et al. | 260/30.6 |
| 4,455,417 | 6/1984 | Vanderkooi et al. | 528/272 |
| 4,749,736 | 6/1988 | Khanna et al. | 524/230 |

FOREIGN PATENT DOCUMENTS 850986 10/1960 United Kingdom ............... 525/432

OTHER PUBLICATIONS

"Encyclopedia of Polymer Science & Engineering," vol. 4, pp. 488–494, John Wiley & Sons, NY 1986.

*Primary Examiner*—Ana L. Carrillo
*Attorney, Agent, or Firm*—Michele G. Mangini; Roger H. Criss

[57] ABSTRACT

Disclosed are compositions and process for the improving the rate of crystallization of polyamide containing compositions which comprise two polyamides having dissimilar melting temperatures, said process comprising the steps of heating the two polyamides to a temperature which is above the melting point of the polyamide having the lower melting temperature but below the melting temperature of the polyamide having the higher melting temperature, as well compositions made in accordance with the process. Preferred polyamides include polycaprolactam and polyhexamethylene adipamide, and the said compositions may optionally include further constituents. The process provided for improved nucleation without the necessity of inorganic nucleation promoters or agents, and articles made in accordance to the process exhibit good physical properties.

11 Claims, 1 Drawing Sheet

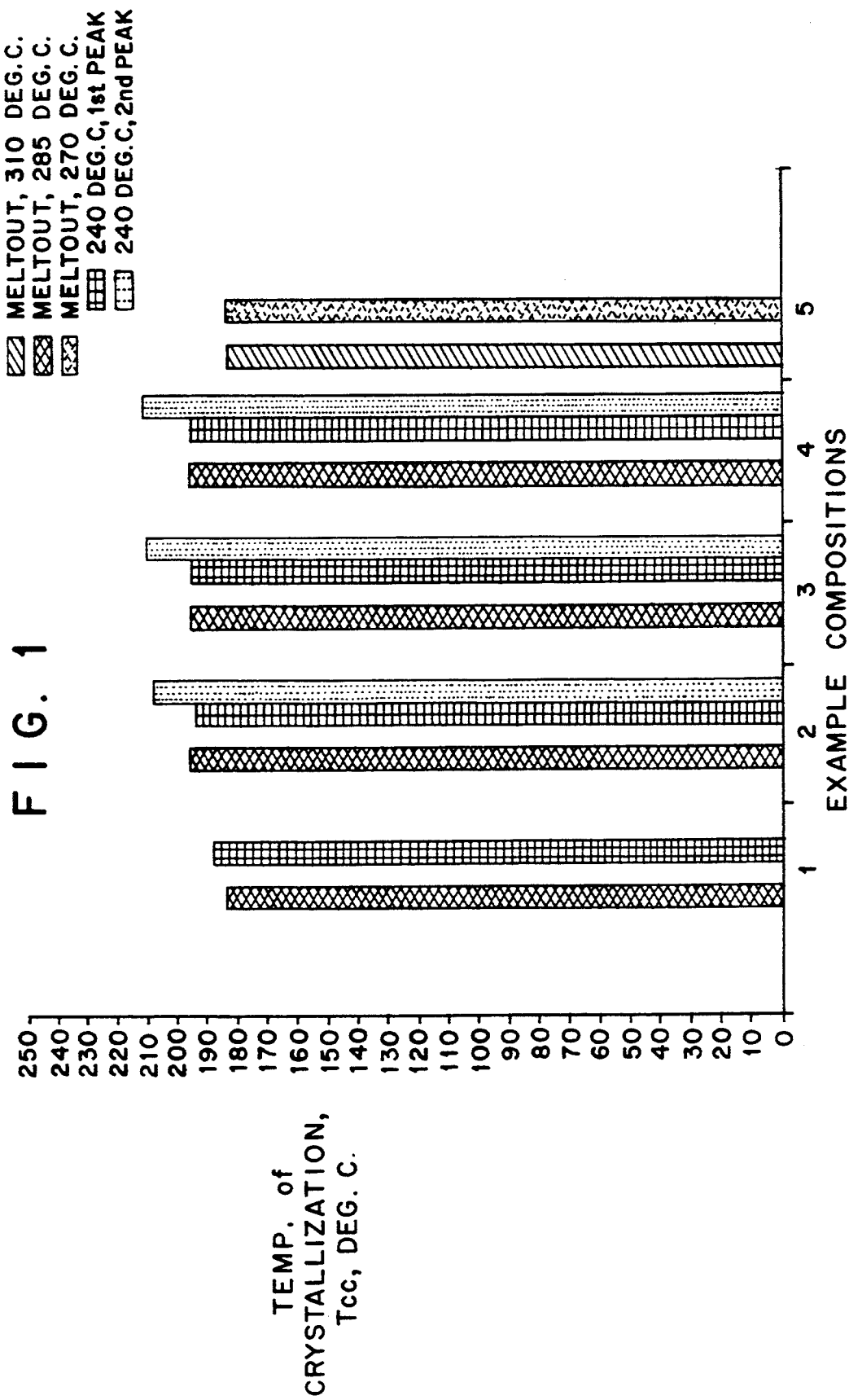

POLYMER NYLON COMPOSITIONS FEATURING IMPROVED RATES OF CRYSTALLIZATION AND METHOD FOR FORMING THE SAME

This application is a continuation of application Ser. No. 08/076,492 filed Jun. 14, 1993, which, in turn, is a file-wrapper-continuation of application Ser. No. 609,689, filed Nov. 6, 1990, all abandoned.

BACKGROUND

1. Field of the Invention

The invention relates to compositions of polymeric materials comprising polyamides; more particularly the present invention relates to compositions comprising two polyamides wherein the composition features improved crystallization rates. The invention also relates to methods for forming such compositions of polymeric materials.

2. Description of the Prior Art

As is well known to the art, thermoplastic polymeric materials which feature a high degree of crystallinity in the final formed article are highly desirable. Such highly crystalline polymeric materials exhibit improvements in several key properties, including resistance to mold shrinkage, heat distortion temperature, maximum dimensional stability and resistance to deformation, hardness, abrasion resistance, tensile yield strength and surface hardness.

To induce or to improve the rate of crystalline formation of a polymer from its amorphous state, typically its molten state which exists during the processing of the polymer and prior to its final molding, casting or shaping step, it is known in the art to use a variety of nucleating agents or other crystalline promoters. Examples of such crystalline promoters include those described in *Nylon Plastics*, M.I. Kohen, J. Wiley & Sons, New York (1973), at p. 424.

For polyamides, known crystallization promoters include finely divided particulates such as those described in U.S. Pat. No. 3,549,651 to Oswald et al. wherein the use of finely divided agents selected from a select group used in conjunction with a plasticizing agent are used in minor amounts relative to the quantity of the polyamide. Other crystallization promoting additives include the system described in U.S. Pat. No. 4,749,736 to Khanna et al. wherein are discussed polyamide compositions which comprise nucleating agents including finely divided inorganic materials, one or more low molecular weight polymers, and one or more fatty acid amides. Further crystallization promoters known to the art include those described in U.S. Pat. No. 3,645,932 wherein are disclosed a group of nucleating agents selected from: polymers and copolymers of monoolefins having of 2-6 carbon atoms the ionomer of ethyleneacrylic acid copolymer, a polyamide of ε-caprolactam, a polyamide of ω-amino undecanoic acid, a polyamide of ω-aminododecanoic acid, a polyamide of hexamethylene diamine and adipic acid, a polyamide of hexamethylene diamine and sebasic acid, or a copolyamide resin derived from polymeric fatty acids, sebasic acid and bis-amino-ethylbenzene, polycarbonate of p,p-1-isopropyliodenediacrylonitrile, butadiene and styrene, natural rubber, balata and paraffin wax, which are dispersed in the polymeric material.

While these nucleation promoters provide beneficial improvements to the compositions within which they may be incorporated, there remains a continuing need in the art to provide molding compositions and nucleation promoters for molding compositions which feature improved characteristics.

SUMMARY

In accordance with the teaching of the present invention there is provided a polyamide containing composition comprising two polyamides, which polyamide containing composition is formed by a process which includes the process step of:

heating the two polyamides to a temperature which is above the melting point of the polyamide having the lower melting temperature but below the melting temperature of the polyamide having the higher melting temperature, with the further proviso that at no time during the process is the temperature of the composition comprising the two polyamides raised to or above the melting temperature of the polyamide having the higher melting temperature. The composition is particularly useful as a molding material for forming articles therefrom.

A still further aspect of the invention is a process for increasing the rate of crystallization of polyamide containing compositions which includes the process steps of:

adding a second polyamide to the composition;

heating the two polyamides to a temperature which is above the melting point of the polyamide having the lower melting temperature but below the melting temperature of the polyamide having the higher melting temperature, with the further proviso that at no time during the process is the temperature of the composition comprising the two polyamides raised to or above the melting temperature of the polyamide having the higher melting temperature.

A further aspect of the invention is a process for increasing the rate of production of articles formed from a molding material comprising two polyamides.

A still further aspect of the invention is a process for improving the rate of crystallinity for formed articles which comprises the process steps of:

providing a molding composition comprising two polyamides, and, heating the two polyamides to a temperature which is above the melting point of the polyamide having the lower melting temperature but below the melting temperature of the polyamide having the higher melting temperature, with the further proviso that at no time during the process is the temperature of the composition comprising the two polyamides raised to or above the melting temperature of the polyamide having the higher melting temperature.

Advantageous effects of the instant invention include the improved rate of production and decreased processing times which are now possible consequent to improved rates of crystallization of such polyamide containing compositions.

BRIEF DESCRIPTION OF THE DRAWING

FIG. 1 depicts the relationship of the temperature of crystallization (Tcc) for different sample meltout temperatures of the compositions according to the Examples noted below.

DESCRIPTION OF THE PREFERRED EMBODIMENTS

Polyamides which find use in accordance with the present invention include those which may be obtained by the polymerization of equimolar proportions of a diamine having two or more carbon atoms between the amine terminal groups with a dicarboxylic acid, or alternately that obtained by the polymerization of a monoamino carboxylic acid or an internal lactam thereof with an equimolar proportion of a diamine and a dicarboxylic acid. Further, suitable polyamides may be derived by the condensation of a monoaminocarboxylic acid or an internal lactam thereof having at least two carbon atoms between the amino and the carboxylic acid groups, as well as other means. General procedures useful for the preparation of polyamides are well known to the art, and the details of their formation are well described under the heading "Polyamides" in the Encyclopedia of Polymer Science and Technology, published by John Wiley & Sons, Inc, Vol. 10, pps.487–491, (1969).

Suitable diamines include those having the formula $$H_2N(CH_2)_nNH_2$$

wherein n has an integer value of 1–16, and includes such compounds as trimethylenediamine, tetramethylenediamine, pentamethylenediamine, hexamethylenediamine, octamethylenediamine, decamethylenediamine, dodecamethylenediamine, hexadecamethylenediamine, aromatic diamines such as p-phenylenediamine, 4,4'-diaminodiphenyl ether, 4,4'-diaminodiphenyl sulphone, 4,4'-diaminodiphenylmethane, alkylated diamines such as 2,2-dimethylpentamethylenediamine, 2,2,4-trimethylhexamethylenediamine, and 2,4,4-trimethylpentamethylenediamine, as well as cycloaliphatic diamines, such as diaminodicyclohexylmethane, and other compounds. The dicarboxylic acids useful in the formation of polyamides are preferably those which are represented by the general formula $$HOOC-Z-COOH$$

wherein Z is representative of a divalent aliphatic radical containing at least 2 carbon atoms, such as adipic acid, sebacic acid, octadecanedioic acid, pimelic acid, subeic acid, azelaic acid, undecanedioic acid, and glutaric acid. The dicarboxylic acids may be aliphatic acids, or aromatic acids, such as isophtalic acid and terephthalic acid.

By means of example, suitable polyamides include: polypropiolactam (nylon 3), polypyrrolidone (nylon 4), polycaprolactam (nylon 6), polyheptolactam (nylon 7), polycaprylactam (nylon 8), polynonanolactam (nylon 9), polyundecaneolactam (nylon 11), polydodecanolactam (nylon 12), poly(tetramethylenediamine-co-oxalic acid) (nylon 4,2), poly(tetramethylenediamine-co-adipic acid) (nylon 4,6), poly(tetramethylenediamine-co-isophthalic acid) (nylon 4,I), polyhexamethylenediamine adipamide (nylon 6,6), polyhexamethylene azelaiamide (nylon 6,9), polyhexamethylene sebacamide (nylon 6,10), polyhexamethylene isophthalamide (nylon 6,I), polyhexamethylene terephthalamide (nylon 6,T), polymethaxyllylene adipamide (nylon MSD:6), poly(-hexamethyl enediamine- co-dodecanedioic acid) (nylon 6,12), poly(dodecamethylenediamine-co-dodecanedioic acid) (nylon 12,12), poly(bis[4-aminocyclohexyl]methane-co-dodecanedioic acid) (PACM-12), as well as copolymers of the above polyamides. By way of illustration and not limitation, such polyamide copolymers include: hexamethylene adipamide-caprolactam (nylon 6,6/6), hexamethylene adipamide/hexamethylene-isophthalamide (nylon 6,6/6IP), hexamethylene adipamide/hexamethylene-terephthalamide (nylon 6,6/6T), trimethylene adipamide-hexamethylene-azelaiamide (nylon trimethyl 6,2/6,2), and hexamethylene adipamide-hexamethylene-azelaiamide caprolactam (nylon 6,6/6,9/6) as well as others polyamide copolymers which are not particularly delineated here.

It has been discovered that the use of an effective amount of a second polyamide may be used as an effective crystallization promoter for a composition which comprises a first polyamide, wherein the second polyamide has a melt temperature higher than the melt temperature of the first polyamide in the composition.

According to the invention, an effective amount of a second polyamide which has a melting point higher than a first polyamide is intimately contacted with the first polyamide to form a polyamide composition which is subsequently subjected to a heating process which includes the process step of heating the polyamide composition to a composition melt temperature which is above the melting point of the first polyamide but below the melting temperature of the second polyamide with the further proviso that at no time during the process is the temperature of the composition comprising the two polyamides raised to or above the melting temperature of the second polyamide.

A further surprising feature of the present invention is that it has been found that the second polyamide need not be present in large amounts relative to the total composition, and may comprise only a relatively small fraction of the total composition. It has been found that the beneficial effect of improved crystallinity has been achieved when the relative ratios of the weight percentages of the second polyamide to the first polyamide is 40%:60%, or 20%:80%, and may be even less; significant increases have been noted even where the ratio of the second polyamide to the first polyamide is 5%:95%. Such an effect has been observed for blends of nylon 6 and nylon 6,6; it is further hypothesized that the similarity of the crystallization characteristics of nylons, particularly as has already been seen for blends of nylon 6 and nylon 6,6, will allow for the practice of other compositions which comprise different polyamides to be used and to enjoy the benefit of an improvement in the temperature of crystallization (Tcc) and consequent more rapid crystallization of the composition from the melt.

The heating process used to form the melt of the polymer compositions comprises the operation of heating the polyamide composition to a temperature which is above that of the first polyamide, but below that of the second polyamide. Such a heating operation may be performed by any apparatus which fulfills this function and by way of example and not by way of limitation, includes reactors, vessels, extruders (both of single and plural screw types), mixers, tumble mixers useful for mixing the constituents in a dry state, molding machines and apparatus, and other blending apparatus suitable for mixing the constituents. Of these, the preferred and most preferred is a screw type extruder having a heated barrel capable of being heated to temperatures in accordance with the invention and which provides adequate mixing of the constituents.

The mixing of the composition containing the first and second polyamide may be effected in any manner known to the art which is known to provide this effect. By way of example and not by way of limitation, suitable methods include thorough blending of the two polyamides, as well as other optional constituents in a mixer, blender, mill or the like, but is preferably and most preferably achieved by providing the constituents of a composition which include the two polyamides as well as other optional constituents to an extruder, either of the single screw type, or of a plural screw type one example of which is a dual screw type, and simultaneously heating and extruding the blended constituents within the process constraints taught herein. The extrudate so formed may be used to either form a final article or may be used to form a particulate feedstock, i.e. pellets, powders, prills or the like for use in a subsequent molding, pressing or casting operation.

Optionally, the heating step may further include the process step of maintaining the temperature of the composition at or about the melt temperature of the first polyamide for a "melt time interval". The length of this melt time interval may be any period of time found within the teaching of the present invention which is found to be effective, i.e., in which it is determined that the first polyamide is sufficiently melted out, and the second polyamide having a higher melt temperature than the first polyamide is not melted out. It is contemplated that this optional heating step may be integrated with the melting operation of the present invention to form a single operative process. The use of a screw type extruder with a heated barrel is contemplated and most preferred for forming compositions in accordance with the instant invention's teaching, and it is further most preferred that the melt time interval be the residence time of the composition in a screw extruder, although the residence time of compositions formed in other apparati including those described above as useful form alternate preferred embodiments. It should be apparent to those skilled in the art that the composition melt temperature, particularly as used in conjunction with the use of a screw type extruder, as well as the optional melt time interval herein described are subject to variation and are to be determined through experimental evaluation as it is recognized that the heating rate need to melt the constituents as well as the melt time interval is a function of the type of process and apparatus with which the instant invention is practiced. Specific times are described with reference to particular process conditions and apparatus in the examples to be discussed below, however it should be recognized that such apparatus and particular times are by way of illustration, and not by way of limitation and that other process times and process conditions and apparatus suited to a particular process not specifically described here may be used.

The compositions of the present invention may be used as a constituent in a molding composition which contains one or more further polymeric constituents which are used to form a mold composition. The relative proportions of such further polymeric constituents may be in any proportion desired which do not deleteriously affect upon the working of the instant invention. It is contemplated that such further polymeric constituents may form either a major proportion or a minor proportion of a molding composition.

The compositions of the present invention may further comprise conventional polymer additives well-known to the art, including fillers, reinforcing agents, stabilizers, dyes, flame retarding agents, mold-release agents, further nucleating agents (if so desired), plasticizers, pigments, ultraviolet light absorption agents, antistatic agents, lubricants, and the like which may be added in effective amounts and which do not deleteriously affect upon the working of the instant invention.

The determination of the crystalline behavior of the polyamide compositions in accordance with the present invention's teachings may be by any known method now known to the art, or which may Be developed in the future and which will operate in a satisfactory manner. By way of example, these include: Differential Scanning Calorimetry techniques and their related apparatus, Differential Thermal Analysis techniques and their related apparatus, and in some cases, Depolarized Light Intensity Techniques and their related apparatus. These apparati are known to the art and their application are discussed in U.S. Pat. Nos. 3,367,926 and 4,749,736 whose discussions are incorporated herein by reference. The analytical technique of Differential Scanning Calorimetry is also discussed under the heading of "Crystallinity Determination —Thermal Analysis" in "Encyclopedia of Polymer Science and Engineering" 2nd. Ed., H. Mark, Ed. published by John Wiley & Sons, New York, 1986, Vol. 4, at p. 488. Of these methods, the preferred method is Differential Scanning Calorimetry, or "DSC", with a suitable commercially available apparatus which performs an automated testing protocol available from the Perkin Elmer Co., as the Perkin Elmer DSC-2C system. This Perkin Elmer DSC-2C was used in the determinations in the example compositions which are set forth below.

It should be evident that compositions according to the invention do not require the use of nucleating agents, such as typically used inorganic materials, and it is known that if used in high amounts, may have a deleterious effect upon the mechanical properties of molding compositions as such inorganic materials are usually chemically incompatible with the polyamides of the molding composition. In contrast, the compositions according to the present invention's teaching provide the benefits which include improved crystallization rates and compatibility between the polyamide which may form the bulk of the molding composition, and the polyamide which acts as a nucleating agent.

The foregoing invention will be more apparent by reference to specific embodiments which are representative of the invention. It is nonetheless to be understood that the particular embodiments described herein are provided for the purpose of illustration, and not be means of limitation, and that it is to be further understood that the present invention may be practiced in a manner which is not exemplified herein without departing from its scope.

EXAMPLES

Comparative Example 1

A composition comprising 100 parts by weight of a nylon 6 polyamide designated "LSM" and described as having the following physical properties: a formic acid viscosity of 70, a number average molecular weight of 22,500 and having approximately 50 mole percent of amine groups as end groups and approximately 50 mole percent of carboxylic acid groups as end groups, was provided to a 1 inch Wayne single screw extruder having a standard general purpose screw and a length-todiameter (L/D) ratio of 25, and a compression ratio 3:1 and further equipped with a 3 inch Maddox mixing section, which was operated at the following temperature profile across the length of the extruder: zones 1–4 at 288 deg. C., die temperature 300 deg. C. The throughput of the extrudate was between 6–7 lbs./hr, with the average residence time of the constituents was approximately 120 seconds. The extrudate was formed into strands which were cooled by drawing through a water bath and which were subsequently chopped into pellets suitable for later use as feedstock for an injection molding operation for forming articles.

Samples of the extrudate formed were analyzed using a Differential Scanning Calorimeter, or the "DSC" (Perkin Elmer DSC-2C) system described above. Each sample was crimped in an aluminum cup, heated to a test temperature at a programmed rate of 10 deg. C. per minute, held there for 30 seconds, and then cooled at a rate of 10 deg. C. per minute to determine the crystallization temperature, "Tcc". For each sample, the peak provided by the system was indicative of the Tcc determined.

A first sample was processed in accordance with the above described protocol and heated to a test temperature of 285 deg. C.; the resultant peak indicated a crystallization temperature of 184 deg. C. Subsequently, a second sample was processed in accordance with the above described protocol to a different test temperature of 240 deg. C.; the resultant peak provided by the DSC indicated a crystallization temperature of 188 deg. C. Results of the DSC testing are set forth on Table 1 and depicted on FIG. 1.

Elmer DSC-2C automated system in accordance with the protocol also discussed therein.

A first sample was heated to a test temperature of 285 deg. C.; the resultant peak indicated a crystallization temperature of 196 deg. C., which by comparison with the composition of comparative example 1, was 12 deg. C. higher. Subsequently, a second sample was processed in accordance with the above-described protocol to a different test temperature of 240 deg. C.; the resultant graph provided by the Perkin Elmer DSC-2C DSC indicated two peaks, one at the temperature of 194 deg. C. which approximates that determined for the first sample, and a second peak at the temperature of 208 deg. C. Further, the ratio of the integral of areas under these respective peaks was in the ratio of approximately 2:1 for the first and second peak respectively.

Surprisingly, the development of this second peak, and its development at the temperature of 208 deg. C., with the relatively small amount of Zytel 101 is indicative of faster crystallization of the total composition from the melt.

Results of the DSC testing are set forth on Table 1 and depicted on FIG. 1 From FIG. 1 it should be apparent that the present invention increases the temperature of the Tcc at which point the composition initiates crystallization from the melt; such is apparent by comparison of the comparative examples to those of the present invention's teachings, namely the composition of examples 2, 3 and 4. Further, the improvement in Tcc is most striking for compositions which have been melted out at temperatures of 240 deg. C. as compared to samples melted out at 285 deg. C. which nonetheless

TABLE 1

| Example | Nylon 6 | Nylon 6,6 | Tcc (310 deg. C.) | Tcc (285 deg. C.) | Tcc (270 deg. C.) | Tcc (240 deg. C.) |
|---|---|---|---|---|---|---|
| 1 | 100 | 0 | — | 184 | — | 188 |
| 2 | 95 | 5 | — | 196 | — | 194, 208 (2:1) |
| 3 | 90 | 10 | — | 195 | — | 195, 210 (1:2) |
| 4 | 80 | 20 | — | 196 | — | 195, 211 (1:2) |
| 5 | 100 | 0 | 183 | — | 184 | — |

Temperatures listed under Tcc are the meltout temperature of the samples
Parenthesized ratios represent ratio of areas determined for respective temperatures using DSC It is to be understood that this composition is for means of comparison, and does not form part of the invention.

Example 2

A composition in accordance with the inventive teaching comprised 95 parts by weight of a nylon 6 polyamide designated LSM as previously described in Example 1, 5 parts by weight of nylon 6,6 polyamide homopolymer commercially available under the trade designation of "Zytel 101" from E. I. DuPont de Nemours and Co. and described as an unmodified polyhexamethylene adipamide homopolymer useful for general molding applications, and which has a density of 71.1 lb/ft$^3$ (1.14 g/cm$^3$). The LSM and the Zytel 101 were both provided to the 1 inch Wayne single screw extruder and processed in accordance with the operating conditions more particularly described in the description of Comparative Example 1 to form an extrudate which was formed into strands and subsequently chopped into pellets suitable for later use as feedstock for an injection molding operation for forming articles.

Samples of the extrudate formed were analyzed using the DSC described in Example 1, namely the Perkin were still improved over the meltout temperatures of the compositions of comparative examples 1 and 5.

Example 3

A composition in accordance with the inventive teaching comprised 90 parts by weight of LSM, the nylon 6, previously described in example 1 and 2, and 10 parts by weight of Zytel 101, the nylon 6,6 homopolymer (both previously described in comparative examples 1 and 2) was combined and provided to the Wayne 1 inch extruder and processed in accordance with the apparatus and procedure used to form the composition of Comparative Example 1 to form pellets suitable for later use as feedstock for an injection molding operation for forming articles.

Samples of the extrudate formed were analyzed using the DSC described in Example 1, with the protocol also discussed therein.

A first sample was heated to a test temperature of 285 deg. C.; the resultant peak indicated a crystallization temperature of 195 deg. C., which by comparison with the composition of comparative example 1, was 11 deg. C. higher. Subsequently, a second sample was processed in accordance with the above described protocol to a different test temperature of 240 deg. C.; the resultant graph provided by the Perkin Elmer DSC-2C DSC indicated two peaks, one at the temperature of 195 deg. C. which coincided with that determined for the first sample, and a second peak at the temperature of 210 deg. C. Further, the ratio of the integral of areas under these respective peaks was in the ratio of approximately 1:2 for the first and second peak respectively. This composition supports the surprising finding that the inclusion of ten parts by weight of nylon 6,6 which is included in the nylon melt, if not completely melted out during processing raises the temperature of crystallization Tcc to 210 deg. C. and makes it the predominant temperature of crystallization on cooling.

Results of the DSC testing are set forth on Table 1 and of the meltout temperatures on FIG. 1.

Example 4

A yet further composition in accordance with the inventive teaching comprised 80 parts by weight of LSM, the nylon 6, previously described in examples 1, 2 and 3, and 20 parts by weight of Zytel 101 nylon 6,6 polyamide homopolymer (both previously described) was provided to the Wayne 1 inch extruder described above and processed in accordance with the apparatus and procedure used to form the composition of Comparative Example 1 to form pellets suitable for later use as feedstock for an injection molding operation for forming articles.

Samples of the extrudate formed were analyzed using the DSC described in Example 1, with the protocol also discussed therein.

A first sample was heated to a test temperature of 285 deg. C.; the resultant peak indicated a crystallization temperature of 196 deg. C., which by comparison with the composition of comparative example 1, was 12 deg. C. higher. Subsequently, a second sample was processed in accordance with the above described protocol to a test temperature of 240 deg. C.; the resultant graph provided by the Perkin Elmer DSC-2C DSC indicated two peaks, one at the temperature of 195 deg. C. which approximated the temperature determined for the first sample, and a second peak at the temperature of 211 deg. C. As was discovered in conjunction with the composition of Example 3, the ratio of the integral of areas under these respective peaks was in the ratio of approximately 1:2 for the first and second peak respectively; this is indicative of a Tcc for the composition of 211 deg. C.

Results of the DSC testing are set forth on Table 1 and of the meltout temperatures on FIG. 1.

Comparative Example 5

A composition comprising 100 parts by weight of a nylon 6 polyamide designated "LSM" and described as having the following physical properties: a formic acid Viscosity of 70, a number average molecular weight of 22,500 and having approximately 50 mole percent of amine groups as end groups and approximately 50 mole percent of carboxylic acid groups as end groups, was provided to a 1 inch Wayne single screw extruder having a standard general purpose screw and a length-to-diameter (L/D) ratio of 25, and a compression ratio 3:1 and further equipped with a 3 inch Maddox mixing section, which was operated at the following temperature profile across the length of the extruder: zones 1–4 at temperatures of between 288 and 292 deg. C., die temperature 292 deg. C. The throughput of the extrudate was between 6–7 lbs./hr, with the average residence time of the constituents was approximately 120 seconds. The extrudate was formed into strands which were cooled by drawing through a water bath and which were subsequently chopped into pellets suitable for later use as feedstock for an injection molding operation for forming articles.

Samples of the extrudate formed were analyzed using a Differential Scanning Calorimeter, or "DSC", a Perkin Elmer DSC-2C automated system. Each sample was crimped in an aluminum cup, heated to a test temperature to form at least a partial melt of the composition at a programmed rate of 10 deg. C. per minute, held there for 30 seconds, and then cooled at a rate of 10 deg. C. per minute to determine the crystallization temperature, "Tcc". For each sample, the peak provided by the system was indicative of the Tcc determined.

A first sample was processed in accordance with the above described protocol and heated to a test temperature of 310 deg. C.; the resultant peak indicated a crystallization temperature of 183 deg. C. Subsequently, a second sample was processed in accordance with the above described protocol to a test temperature of 270 deg. C.; the resultant peak provided by the DSC indicated a crystallization temperature of 184 deg. C. Afterwards, the test was again repeated, and a third sample was tested in accordance with the described protocol and heated to a test temperature of 240 deg. C. and analyzed by the DSC. The results indicated a peak at 188 deg. C. Results of the DSC testing are set forth on Table 1.

It is to be understood that this composition is for means of comparison, and does not form part of the invention.

It will be appreciated that the instant specifications and examples set forth herein are by way of illustration and not limitation, and that various modifications and changes may be made without departing from the spirit and scope of the present invention, whose limitations are bounded only by the appendant claims.

We claim:

1. A process for producing a polyamide molding resin composition suitable for use in extrusion molding and injection molding, comprising at least two polyamides, which process includes the process step of:

heating the polyamide molding resin composition to a temperature which is above the melting point of a first polyamide having the lower melting temperature but below the melting temperature of a second polyamide having the higher melting temperature than the first polyamide, with the proviso that at no time during the process is the temperature of the composition raised to or above the melting temperature of the polyamide having the higher melting temperature.

2. The process according to claim 1 wherein the composition comprises polycaprolactam (nylon 6).

3. The process according to claim 1 wherein the composition comprises polyhexamethylenediamine adipamide (nylon 6,6).

4. A polyamide molding resin composition comprising two polyamides produced in accordance with the method of claim 1.

5. A process for increasing the rate of crystallization of a polyamide molding resin composition suitable for use in extrusion molding and injection molding comprising two polyamides, which process includes the process step of:

heating the polyamide molding resin composition to a temperature which is above the melting point of a first polyamide having the lower melting temperature of a second polyamide having the higher melting temperature than the first polyamide, with the proviso that at no time during the process is the temperature of the composition raised to or above the melting temperature of the polyamide having the higher melting temperature.

6. The process according to claim 5 wherein the composition comprises polycaprolactam (nylon 6).

7. The process according to claim 5 wherein the composition comprises polyhexamethylenediamine adipamide (nylon 6,6).

8. A polyamide molding resin composition comprising two polyamides produced in accordance with the method of claim 6.

9. A process for producing a polyamide molding resin composition suitable for use in extrusion molding and injection molding comprising at least two polyamides wherein the composition has a temperature of crystallization which is greater than the temperature of crystallization of the polyamides of its composition which has the lowest temperature of crystallization, which process includes the step of:

heating the polyamide molding resin composition to a temperature which is above the melting point of the polyamide having the lower melt temperature but below the melting temperature of a second polyamide having the higher melting temperature than the first polyamide so to melt the polyamide having the lowest temperature of crystallization but insufficiently heating the composition to avoid a complete melt of the second polyamide, with the proviso that at no time during the process is the temperature of the composition raised to or above the melting temperature of the polyamide having the higher melting temperature.

10. A process for preparing a molded article comprising the steps of:
 (a) forming a composition of two polyamides wherein the melting point of the second polyamide is higher than the melting point of the first polyamide;
 (b) heating said composition to a temperature which is above the melting point of said first polyamide and below the melting temperature of said second polyamide wherein said heating does not completely melt said second polyamide; and
 (c) injection or extrusion molding said composition to form said molded article, with the proviso that at no time during the process is the temperature of the composition raised to or above the melting temperature of the polyamide having the higher melting temperature.

11. A process for preparing a polyamide molding resin suitable for use in extrusion molding and injection molding comprising the steps of:
 (a) forming a composition of two polyamides wherein the melting point of the second polyamide is higher than the melting point of the first polyamide; and
 (b) in the absence of an inorganic nucleating agent, heating said composition to a temperature of said second polyamide wherein said heating does not completely melt said second polyamide, with the proviso that at no time during the process is the temperature of the composition raised to or above the melting temperature of the polyamide having the higher melting temperature.

* * * * *